United States Patent [19]
Dent et al.

[11] 3,814,541
[45] June 4, 1974

[54] FLUID SUPPLY APPARATUS

[75] Inventors: William Barron Dent; Allan Jenner-Clarke, both of Surrey, England

[73] Assignee: Delta-Controls Limited, Surrey, England

[22] Filed: Nov. 24, 1971

[21] Appl. No.: 201,835

[52] U.S. Cl. .................. 417/7, 137/114, 417/20, 417/28, 417/43
[51] Int. Cl. ............................................. F04b 41/06
[58] Field of Search ........ 137/114, 118, 110; 417/5, 417/6, 7, 43, 20, 28

[56] References Cited
UNITED STATES PATENTS

| | | | |
|---|---|---|---|
| 1,931,771 | 10/1933 | Pinkerton | 417/7 |
| 2,719,080 | 9/1955 | Schmidt | 137/114 X |
| 3,286,636 | 11/1966 | Schaub | 137/110 X |
| 3,294,105 | 12/1966 | Schaub | 137/118 X |

*Primary Examiner*—Carlton R. Croyle
*Assistant Examiner*—Richard Shea
*Attorney, Agent, or Firm*—Dowell & Dowell

[57] ABSTRACT

A method and apparatus for controlling fluid supplied to a delivery conduit comprising setting a fluid control valve in accordance with the fluid flow demanded by the delivery conduit to maintain the fluid pressure drop across the valve at a predetermined substantially constant level and activating a number of limited flow fluid sources, determined by the setting of the valve and sufficient to deliver the demanded flow to the delivery conduit.

11 Claims, 3 Drawing Figures

PATENTED JUN 4 1974 3,814,541

FLUID SUPPLY APPARATUS

This invention relates to fluid (liquid or gas) supply apparatus and in particular to fluid supply apparatus wherein the fluid flow is controlled in accordance with the demand.

A previously proposed form of apparatus for supplying such a controlled flow of fluid includes one large delivery pump and control means for controlling the flow of fluid therefrom in accordance with the demand. Such apparatus has the disadvantages that to run a large pump for small delivery is uneconomic, a failure in the pump makes the apparatus inoperable and it is expensive to maintain spare pumps.

Another previously proposed form of apparatus for controlling a flow of fluid from a number of pumps or similar discrete sources includes a fixed orifice type of flow measuring device and a series of differential pressure switches to operate the pumps in sequence so as to meet the demanded fluid flow. Such apparatus has the disadvantage that if there is sufficient pressure to reliably operate the first switch and hence the first pump, then at high flows the pressure loss is too high for economic running of the overall system.

These disadvantages may be overcome, in accordance with the invention, by a method of controlling fluid supplied to a delivery conduit comprising setting a fluid control valve in accordance with the fluid flow demanded by the delivery conduit to maintain the fluid pressure drop across the valve at a predetermined substantially constant level and activating a number of limited-flow fluid sources, determined by the setting of the valve and sufficient to deliver the demanded flow to the delivery conduit.

This method may be performed using fluid supply apparatus, in accordance with the invention, which comprises two or more limited flow fluid supply sources connected to a common delivery conduit; and control means comprising a fluid control valve arranged in the common conduit, the setting of the valve being determined, in use by means responsive to the fluid pressure drop across the valve so as to maintain the pressure drop at a substantially constant level, switching means responsive to the setting of the control valve being arranged for sequentially activating a sufficient number of supply sources to deliver the demanded fluid flow. When the fluid to be supplied is a liquid the conduits may comprise open channels, if suitable. The fluid supply sources may for example be gasometers or gas wells, reservoirs, pumps etc. The apparatus preferably includes pressure sensitive means arranged to ensure that the fluid pressure upstream of the valve is maintained at a substantially constant predetermined level.

The control valve preferably comprises a valve slide which is slidable along on axis so that its position determines the area of an orifice through which the fluid must flow.

The control valve is preferably biased closed by means which are restrained as long as power is available for operating the control means, so that in the event of the power failing the valve automatically closes.

The fluid supply apparatus in accordance with the invention may be used, for example, to deliver liquid fuel for aircraft at an airport. In this case the demanded fluid flow varies greatly; at one time one pump may be sufficient to deliver the flow required, at another time a large number of the pumps may be necessary to deliver the flow required.

One embodiment of the invention will now be described with reference to the accompanying drawings in which.

Figure 2:
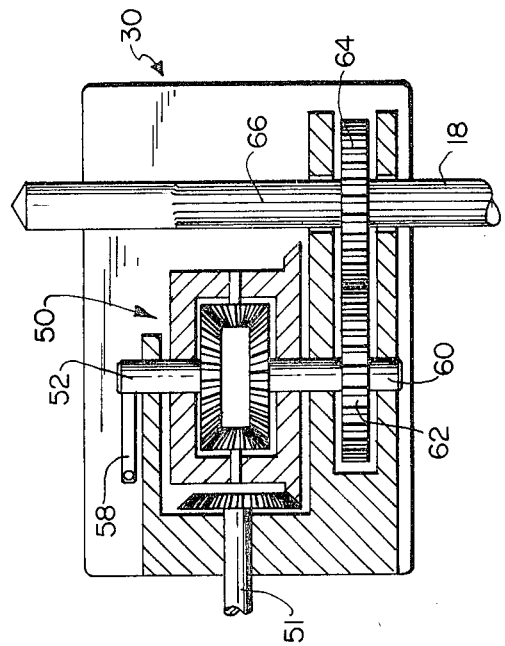
FIG. 2 shows a detail, partly in cross-section, of a torque limit switch of the apparatus of FIG. 1.
Figure 3:
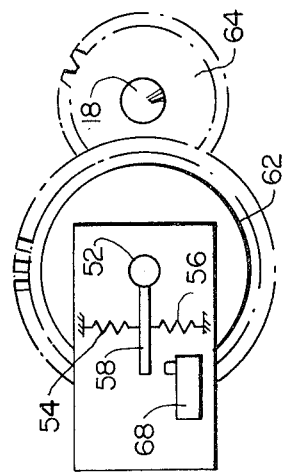
FIG. 3 shows a top plan view of part of the switch unit of FIG. 2.

As will be seen from the drawing the fluid supply apparatus includes a number of limited flow fluid supply sources, in this case fluid supply pumps 1, 2, 3 . . . N. The number of pumps is chosen according to their size and according to the maximum fluid flow required. The supply pumps discharge into a common conduit comprising a pipe 10 and through a control valve 12 to a delivery pipe 14. The pumps illustrated are for pumping liquid, it will be appreciated however that the invention is equally applicable to gas-supply apparatus.

The control valve 12 has a slide 16 which is coupled to a rotatable valve stem 18. The valve stem has a threaded portion 20 which engages in a corresponding threaded portion 22 of the cover of the valve 12. The stem is sealed at 24 to the cover so as to prevent leakage of the fluid. Rotation of the valve stem causes the slide 16 to move so as to vary the area of an orifice 26 through which the fluid flows. The valve stem is driven to rotate by a valve motor 28 through a drive and torque limit switch unit 30 through which it extends, its free upper end being located in a sequential switching unit 32. The torque limit switch unit 30 comprises a differential gear device 50 driven by the motor 28 via shaft 51 and one half-shaft 52 of which is resiliently constrained by means of springs 54 and 56 acting oppositely on arm 58. The other half-shaft 60 acts to drive the valve stem 18 via gears 62 and 64, the latter being splined to the stem 18 at 66 to allow sliding movement thereof. At the limit of travel of the valve slide the constrained half-shaft 52 rotates sufficiently to open a switch 68 thus open circuiting the supply to the motor 28.

A fluid pressure line 34 provides communication between the up-stream side of the control valve 12 one side of a differential pressure switch 36 and a pressure switch 38. A fluid pressure line 40 provides communication between the down-stream side of a control valve 12 and the other side of the differential pressure switch 36.

The pressure switch 38 is arranged to connect an electrical conductor 42 to a power supply when the fluid pressure is below a predetermined value and to disconnect the conductor from the power supply when the fluid pressure is above a predetermined value. The pressure line 34 is preferably restricted by a snubber (not shown) between the differential pressure switch 36 and the pressure switch 38 in order to slow the response of the pressure switch 38 and prevent hunting particularly when the control valve is shut. The conductor 42 is connected via normally closed contacts of a switch 45 in a sequential switching unit 32 and a conductor 70 to one of the supply terminals of the driving motor of the delivery pump 1 which is thus energized when the conductor 42 is connected to the power supply. The conductor 45 is also connected via conductors 72 and 74 to one terminal of each of a number of normally open switches 44 contained in the sequential switch unit 32, the other terminal of each of the switches being connected to drive motors of ther delivery pumps 2, 3 . . . N respectively.

Figure 1:
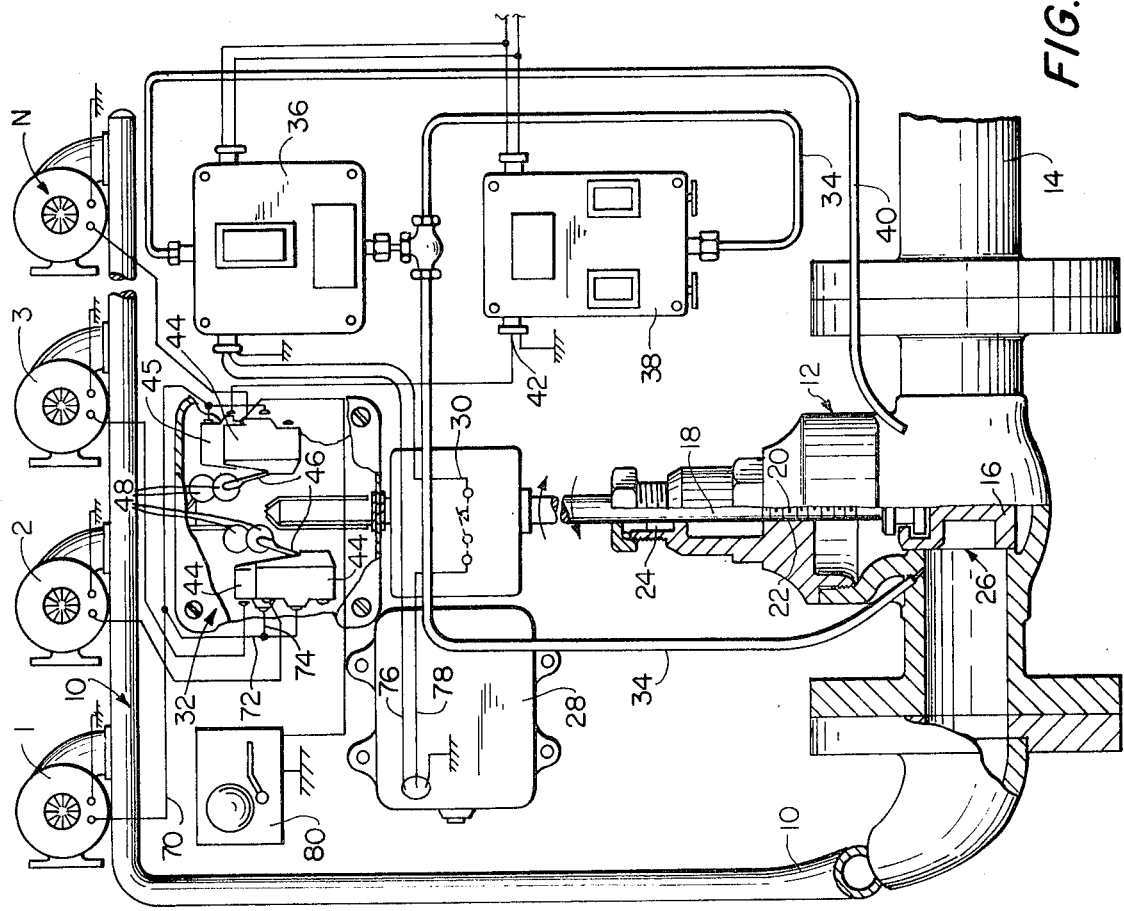
FIG. 1 shows schematically a fluid supply apparatus in accordance with the invention.

Each switch 44 has an operating lever 46 at the end of which is mounted a roller 48. As the valve stem 18 travels upwardly (as seen in FIG. 1), it engages each of the rollers 48 in turn thus making a circuit to supply each of the driving motors of each of the delivery pumps. As the valve stem travels downwardly (as seen in FIG. 1) it disengages from the rollers 48 of the switches in turn so allowing the operating arms to return to the position shown in the drawing so that the supplies to the respective pump motors are cut off.

The operation of the apparatus is as follows.

The pressure switch 38 acts to switch on a supply to the pump motors via conductor 42 when the pressure at the up-stream side of the control valve 12 falls below a predetermined value, and to cut off the supply when the pressure approaches a value which would cause the pumps to stall so maintaining a substantially constant predetermined pressure upstream of the valve.

The differential pressure switch 36 operates at four predetermined pressure differences across the control valve 12. Consider the highest of these pressure differences to be A and the lowest of these pressure differences to be B. When the pressure difference rises above A the differential switch 36 operates to close the switch so as to energise the valve motor 28 via a conductor 76 to rotate in its opening direction. When the differential pressure falls to a predetermined level between pressure differences A and B, the switch opens so cutting off the supply to valve motor 28. When the differential pressure across the control valve 12 falls below the pressure difference B, the differential pressure switch operates to close a second switch which energises the valve motor 28 via a conductor 78 and torque limit switch 30 to rotate in its closing direction so as to close the valve 12. When the differential pressure has risen to a predetermined level between the pressure differences A and B the differential pressure switch 36 operates to open the second switch so de-energising the valve motor 28.

It will thus be appreciated that the position of the valve slide 16 is such as to maintain a pressure drop across the valve which is in between the two predetermined levels. It will be further appreciated that the position of the slide and its valve stem 18 depend upon the demand for fluid from the pipe 14. That is, the position of the slide 16 and its valve stem 18, depend upon the resistance to flow in the pipe 14, for example, if two equal outlets are delivering fluid from the pipe 14, the resistance to flow would be less than if only one of the outlets were delivering fluid.

As the valve stem 18 moves upwardly or downwardly the outer end portion of the valve stem engages in turn the rollers of the operating switches 44. As the demand for fluid is increased initially the pressure drop across the control valve 12 increases so that the valve slide is moved to a more open position to maintain this pressure drop between the predetermined levels. As the valve stem moves upwardly it operates a number of the switches 44, so as to energise the motors of sufficient number of pumps to deliver the demanded quantity of fluid.

If the demanded fluid flow falls then the pressure drop across the control valve 12 also falls initially and the differential pressure switch 36 operates to energise the valve motor 28, so as to rotate the valve stem 18 to close the valve slide until the pressure drop reaches the predetermined value. As the valve slide 18 retracts it disengages from some of the rollers of the operating levers of the switches 44 so that only the number of motors required to deliver the demanded fluid flow are left energised.

It will be appreciated that as the valve constitutes a variable orifice and as the differential pressure across it is maintained between two predetermined values the degree of opening of the valve will be proportional, in accordance with some definable law, to the flow through the valve.

The positions of the switches 44 in the sequential switching unit 32 are determined by the flow capacity of the individual pumps and the law governing the relationship between the flow through the valve and the valve position.

In the case when there is no demand then supply pump 1 runs until the pressure up-stream of the control valve causes the pressure switch 38 to cut off the supplies to the pumps. Under these circumstances, since no differential pressure is developed across the valves 12, the valve closes completely and its motor is stopped by a torque limit switch on the valve stem which is arranged to over-ride the differential pressure switch. In order not to over-load the apparatus, if the demanded fluid flow is too great for all of the pumps to deliver, the control valve continues to open (as the pressure drop across it is still too large) and operates a switch 45 which opens to cut off all of the supplies and sounds an alarm 80.

The apparatus may be modified, for example, the differential pressure switch 36 may be replaced with a differential pressure transducer so arranged as to provide an output signal proportional to the error between the actual differential pressure and a required differential pressure. In this case the output signal from the differential pressure transducer is preferably fed into a differentiator and an integrator, and the output signal together with the differentiated and integrated signals are then fed into a summing unit which is arranged to proportionally drive the valve motor 28. The relative magnitudes of the proportional signal, the differentiated signal and the integrated signal are chosen according to normal control theory so as to provide a stable, fast response to the operation of the valve motor 28.

The apparatus may be further modified, for example, a pressure relief valve may be provided to replace the pressure switch 38 to maintain a substantially constant pressure upstream of the valve. In this case pump 1 is connected so as to run continuously and the motors of pumps 2, 3 . . . N, are connected to a respective switch 44.

In an alternative arrangement the valve stem only slidably engages the valve housing and is provided with a threaded portion (not shown) within the drive unit 30 which is engaged by an axially fixed nut which is driven to rotate by the motor 28 so sliding the valve stem (which is restrained against rotation) to determine the setting of the valve slide 16. In a preferred modification, the nut is split and whilst electrical power is supplied to the control means the parts are held together by solenoid means which release the nut on failure of the power allowing an axial compression spring to close the valve.

In cases where the apparatus is required to supply inflammable or explosive fluids the electrical equipment may be in flame proof enclosures or designed to be intrinsically safe in accordance with normal practice.

The switch unit may be differently arranged, for example in a preferred arrangement a number of cams are adjustably arranged on a common shaft and driven by the motor 28 to rotate one revolution for the whole travel of the valve spindle and slide, the switches 44 and 45 being arranged for operation by respective cams.

In an envisaged application for safety reasons two parallel common delivery conduits are provided and in this case control valves 12 are provided in each delivery conduit each operated by a respective motor 28 and drive unit 30. The conduits are interconnected up stream and down stream of the control valves and the mean pressure drop is sensed.

Switch units 32 are provided for each valve and the respective switches 44 and 45 thereof are connected in parallel pairs (one pair for each fluid source) so that the first of each pair to be operated actuates or deactuates the respective fluid supply sources.

The control circuit may be arranged with suitable programming means (not shown) such as switches or a patch board to enable any of the fluid supply sources particularly when these comprise pumps or the like to be connected to any of the switches 44. By this means the order of the sources may be rotated periodically so as to even their operating periods, as for example the source connected to the first in sequence of the switches 44 will normally operate more often than the other sources.

The control circuit may be provided with additional means whereby on failure of one source to activate when switched by its respective switch 44, another (the next for example) source is activated. This may be achieved by providing a pressure switch (not shown) for each fluid source arranged to sense the pressure up stream of the control valve 12 and, if the respective switch 44 is made and the sensed pressure is lower than a predetermined value, to activate the next source in sequence after a brief delay. An alarm may also be actuated. If further fluid is demanded as the said source next in sequence is already activated operation of its respective switch 44 causes the now next in sequence source to be activated.

We find it convenient to connect a potentiometer (not shown) so that its wiper is driven to correspond with the position of the valve slide. The track of the potentiometer is supplied with a constant voltage and the wiper is connected to a voltmeter (calibrated in flow) to provide an approximate indication of the fluid flow supplied. As the total movement of the valve before being arrested by operation of switch 45 is greater than the range of fluid flow a voltage or current limiting circuit is provided to ensure no damage to the meter is incurred due to over-travel of the valve.

In emergencies, if the control equipment for determining the position of the control valve fails, the valve may be operated manually in which case the pumps may still be activated by the switch unit in accordance with the valve's position.

It will be appreciated that whilst an electrical control circuit and pump motors have been described, fluidic, hydraulic, pneumatic circuits and motors or any combination thereof may alternatively be employed.

We claim:

1. A method of controlling fluid supplied to a delivery conduit comprising adjusting the setting of a settable flow restrictor element in accordance with the fluid flow demanded by the delivery conduit to maintain the fluid pressure drop across said restrictor element at a predetermined substantially constant level and activating a number of limited flow fluid sources, said number being determined by said setting.

2. A method as claimed in claim 1 wherein the fluid pressure upstream of said restrictor element is maintained substantially constant.

3. Fluid supply apparatus comprising: a delivery conduit; at least two limited flow fluid supply sources connected to said delivery conduit and control means comprising
   a settable flow restrictor element in said delivery conduit;
   pressure sensing means sensitive to the fluid pressure drop across said restrictor
   restrictor element adjusting means responsive to the pressure sensing means to adjust the setting of said restrictor element to maintain a substantially constant pressure drop thereacross;
   sequentially operable switching means responsive to the setting of said restriction to activate a number of said supply sources, said number depending on said setting.

4. Fluid supply apparatus as claimed in claim 3 wherein said fluid supply sources comprise pumps.

5. Fluid supply apparatus as claimed in claim 3 including an additional switch arranged for operation last in said sequence on over travel of said restrictor element when the demand exceeds the capacity of all of said limited flow fluid supply sources, said additional switch being operatively connected to deactivate said sources.

6. Fluid supply apparatus as claimed in claim 3 including further switching means for each said fluid supply source, sensitive to the fluid pressure upstream of said restrictor element and to operation of the first mentioned switching means and connected to activate another said fluid supply source if said upstream pressure remains below a predetermined value after operation of said first mentioned switching means to activate a said source.

7. Fluid supply apparatus as claimed in claim 3 wherein said restrictor element comprises a slide, means mounting said slide for sliding movement along an axis and means defining with the slide an orifice having an area defined by the position of said slide along said axis and through which the fluid flows, said adjusting means being operatively connected to said slide for setting said slide at different positions along said axis.

8. Fluid supply apparatus as claimed in claim 3 wherein said pressure sensing means comprises a differential pressure switch and wherein said adjusting means comprises a control motor operatively connected to control the setting of said restrictor element, said pressure switch acting to energize said motor when said pressure drop lies outside a predetermined range to drive said restrictor element to a new setting wherein the pressure drop lies within said range, and acting to de-energize said motor when the pressure drop lies within said range.

9. Fluid supply apparatus as claimed in claim 3 wherein said pressure sensing means comprises a differential pressure transducer for generating an output error signal dependent on the error between said pressure drop across and a predetermined desired pressure drop, and wherein said restrictor element adjusting means comprises a control motor operatively connected to said restrictor element and to the said pressure transducer to drive the restrictor element to a setting at which said error signal is zero.

10. Fluid supply apparatus as claimed in claim 3 wherein the control means is electrical and including bias means biasing said restrictor element closed and restraining means sensitive to a supply of electrical power to the control means to normally restrain the bias and to release the bias to close the restrictor element in the event of an electrical power failure.

11. Fluid supply apparatus as claimed in claim 3 including an additional switch arranged for operation last in said sequence on over travel of said restrictor element when the demand exceeds the capacity of all of said limited flow fluid supply sources, said additional switch being operatively connected to deactivate said sources.

* * * * *